United States Patent
Lin et al.

(10) Patent No.: US 12,184,583 B2
(45) Date of Patent: Dec. 31, 2024

(54) RESOURCE DETERMINATION METHOD, APPARATUS, AND STORAGE MEDIUM

(71) Applicant: GUANGDONG OPPO MOBILE TELECOMMUNICATIONS CORP., LTD., Guangdong (CN)

(72) Inventors: Yanan Lin, Dongguan (CN); Zuomin Wu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 414 days.

(21) Appl. No.: 17/508,431

(22) Filed: Oct. 22, 2021

(65) Prior Publication Data

US 2022/0045828 A1 Feb. 10, 2022

Related U.S. Application Data

(63) Continuation of application No. PCT/CN2019/085214, filed on Apr. 30, 2019.

(51) Int. Cl.
*H04L 5/00* (2006.01)
*H04W 72/04* (2023.01)
*H04W 72/044* (2023.01)
*H04W 72/23* (2023.01)

(52) U.S. Cl.
CPC ......... *H04L 5/0055* (2013.01); *H04W 72/044* (2013.01); *H04W 72/23* (2023.01)

(58) Field of Classification Search
CPC .... H04L 5/0055; H04W 72/23; H04W 72/044
See application file for complete search history.

(56) References Cited

U.S. PATENT DOCUMENTS

| | | | |
|---|---|---|---|
| 10,187,185 B2 | 1/2019 | Bergström et al. | |
| 10,512,065 B2 * | 12/2019 | Luo | H04L 1/1685 |
| 2017/0373802 A1 | 12/2017 | Bergström et al. | |
| 2018/0006863 A1 * | 1/2018 | Li | H04W 72/23 |
| 2018/0278454 A1 | 9/2018 | Islam | |

(Continued)

FOREIGN PATENT DOCUMENTS

| | | | |
|---|---|---|---|
| CN | 102237927 A | 11/2011 | |
| CN | 108024362 A | 5/2018 | |

(Continued)

OTHER PUBLICATIONS

Intel Corporation. "3GPP TSG RAN WG1 Meeting #96bis R1-1904287" Enhancements to HARQ for NR-unlicensed, Mar. 29, 2019(Mar. 29, 2019).

(Continued)

*Primary Examiner* — Michael J Moore, Jr.
(74) *Attorney, Agent, or Firm* — Perkins Coie LLP

(57) ABSTRACT

Disclosed is a resource determination method, including: a terminal apparatus receiving first signaling, the first signaling instructing the terminal apparatus to send feedback acknowledgement information corresponding to at least one downlink channel; and the terminal apparatus determining, on the basis of the first signaling, a resource for transmitting the feedback acknowledgement information. Also disclosed are another resource determination method, a terminal apparatus, a network apparatus, and a storage medium.

16 Claims, 3 Drawing Sheets

(56) References Cited

U.S. PATENT DOCUMENTS

| | | | |
|---|---|---|---|
| 2019/0103947 | A1 | 4/2019 | Park |
| 2020/0044791 | A1* | 2/2020 | Tsai .................... H04L 1/1854 |
| 2020/0106569 | A1* | 4/2020 | Tsai .................... H04W 72/23 |
| 2020/0344012 | A1* | 10/2020 | Karaki ................ H04L 1/1861 |
| 2020/0366417 | A1 | 11/2020 | Lei et al. |
| 2020/0389878 | A1* | 12/2020 | Karaki ................ H04W 72/23 |
| 2021/0314102 | A1* | 10/2021 | Li ........................ H04L 1/1896 |
| 2021/0321353 | A1* | 10/2021 | Muruganathan ...... H04W 72/23 |
| 2022/0014317 | A1* | 1/2022 | Wu ...................... H04W 72/23 |
| 2022/0045828 | A1* | 2/2022 | Lin ...................... H04L 1/1621 |
| 2022/0201605 | A1* | 6/2022 | Yang ................ H04W 52/0235 |
| 2023/0291505 | A1* | 9/2023 | Park .................... H04L 5/0096 |

FOREIGN PATENT DOCUMENTS

| | | |
|---|---|---|
| CN | 108604945 A | 9/2018 |
| CN | 109600212 A | 4/2019 |
| CN | 109644451 A | 4/2019 |
| EP | 3491871 A1 | 6/2019 |
| EP | 3491871 A4 | 7/2019 |
| JP | 2019530260 A | 10/2019 |
| WO | 2018010077 A1 | 1/2018 |
| WO | 2018079571 A1 | 5/2018 |
| WO | 2018081999 A1 | 5/2018 |
| WO | 2018128356 A1 | 7/2018 |
| WO | 2018158923 A1 | 9/2018 |
| WO | 2019028844 A1 | 2/2019 |
| WO | 2020034533 A1 | 2/2020 |

OTHER PUBLICATIONS

International Search Report in the international application No. PCT/CN2019/085214, mailed on Jan. 8, 2020.
Huawei."3GPP TSG RAN WG1 Meeting AH1901 R1-1901357", Feature lead summary of HARQ enhancements for NR-U, Taipei, Jan. 21-25, 2019.
Huawei."3GPP TSG RAN WG1 Meeting AH1901 R1-1901437", Feature lead summary of HARQ enhancements for NR-U, Taipei, Jan. 21-25, 2019.
Huawei: "Feature lead summary of HARQ enhancements for NR-U", 3GPP Draft; R1-1905649, 3GPP, vol. RAN WG1 Apr. 10, 2019, XP051707708. 29 pages.
Lenovo et al:"HARQ-ACK enhancement for NR-U" 3GPP Draft; R1-1900396, 3GPP, vol. RAN WG1, No. Taipei; Jan. 21, 2019-Jan. 25, 2019, XP051593310. 4 pages.
Office Action of the Indian application No. 202117049845, issued on Apr. 11, 2022. 7 pages with English translation.
Supplementary European Search Report in the European application No. 19927323.6, mailed on Mar. 2, 2022. 11 pages.
VIVO:"Discussion on HARQ operation for NR-U" 3GPP Draft; R1-1904067 3GPP, vol. RAN WG1, No. Xi'an, China; Apr. 8, 2019-Apr. 12, 2019, XP051699463. 7 pages.
Written Opinion of the International Search Authority in the international application No. PCT/CN2019/085214, mailed on Jan. 8, 2020. 10 pages with English translation.
First Office Action of the Chinese application No. 202110553180.6, issued on Jun. 16, 2022.
Second Office Action of the Japanese application No. 2021-563648, issued on May 30, 2023. 8 pages with English translation.
3GPP TSG RAN WG1 Ad-Hoc Meeting #96bis R1-1904183, Xi'an, China, Apr. 8-12, 2019, Agenda item: 7.2.2.2.3, Source: Nokia, Nokia Shanghai Bell, Title: HARQ scheduling and feedback for NR-U, Document for: Discussion and Decision. 12 pages.
3GPP TSG RAN WG1 NR Ad-Hoc#2 R1-1710729, Qingdao, P.R. China Jun. 27-30, 2017, Agenda item: 5.1.3.3.5.2, Source: Samsung, Title: HARQ-ACK codebook determination, Document for: Discussion and decision. 4 pages.
Notice of Allowance of the Chinese application No. 202110553180.6, issued on Jan. 18, 2023. 5 pages with English translation.
First Office Action of the Japanese application No. 2021-563648, issued on Feb. 17, 2023. 8 pages with English translation.
Decision of Refusal of the Japanese application No. 2021-563648, issued on Sep. 12, 2023. 9 pages with English translation.
First Office Action of the Vietnamese application No. 1-2021-07155, issued on Sep. 11, 2023. 3 pages with English translation.
Hearing Notice of the Indian application No. 202117049845, issued on Jun. 28, 2024, 2 pages with English translation.
First Office Action of the Mexican application No. MX/a/2021/013164, issued on Jul. 30, 2024, 8 pages with English translation.
First Office Action of the Korean application No. 10-2021-7038054, issued on Sep. 24, 2024. 11 pages with English translation.

* cited by examiner

RESOURCE DETERMINATION METHOD, APPARATUS, AND STORAGE MEDIUM

CROSS-REFERENCE TO RELATED APPLICATION

This is a continuation application of International Patent Application No. PCT/CN2019/085214, filed on Apr. 30, 2019, the contents of which are hereby incorporated by reference in its entirety.

TECHNICAL FIELD

The present disclosure relates to the technical field of wireless communication technology, and particularly to a method for resource determination, a device and a storage medium.

RELATED ARTS

In a new radio (NR) system, after a network device transmits a physical downlink shared channel (PDSCH) scheduled by downlink control information (DCI) to a terminal device, the terminal device needs to transmit acknowledgement information corresponding to the PDSCH to the network device based on triggering signaling. Therefore, it is necessary to solve the problem of how to determine a resource for transmitting the acknowledgement information corresponding to the PDSCH, to improve the flexibility of transmission of the acknowledgement information and the transmission efficiency of the system.

SUMMARY

To solve the abovementioned technical problem, embodiments of the disclosure provide a method for resource determination, a device and a storage medium.

According to a first aspect, embodiments of the disclosure provide a method for resource determination, and the method includes the following operations. A terminal device receives first signaling used for indicating the terminal device to transmit acknowledgement information for at least one downlink channel. The terminal device determines, based on the first signaling, a resource for transmitting the acknowledgement information.

According to a second aspect, embodiments of the disclosure provide a method for resource determination, and the method includes the following operations. A network device transmits first signaling used for indicating a terminal device to transmit acknowledgement information for at least one downlink channel. The first signaling is used for the terminal device to determine a resource for transmitting the acknowledgement information.

According to a third aspect, embodiments of the disclosure provide a terminal device, and the terminal device includes a receiving unit and a processing unit. The receiving unit is configured to receive first signaling used for indicating the terminal device to transmit acknowledgement information for at least one downlink channel. The processing unit is configured to determine a resource for transmitting the acknowledgement information based on the first signaling.

According to a fourth aspect, embodiments of the disclosure provide a network device, and the network device includes a transmitting unit. The transmitting unit is configured to transmit first signaling used for indicating a terminal device to transmit acknowledgement information for at least one downlink channel, wherein the first signaling is used for the terminal device to determine a resource for transmitting the acknowledgement information.

According to a fifth aspect, embodiments of the disclosure provide a terminal device, the terminal device includes a processor and a memory for storing a computer program capable of running on the processor. The processor is configured to run the computer program to execute operations of the method for resource determination performed by the terminal device.

According to a sixth aspect, embodiments of the disclosure provide a network device, the network device includes a processor and a memory for storing a computer program capable of running on the processor. The processor is configured to run the computer program to execute operations of the method performed by the network device.

According to a seventh aspect, embodiments of the disclosure provide a storage medium having stored therein an executable program that when executed by a processor, executes the method for resource determination performed by the terminal device.

According to an eighth aspect, embodiments of the disclosure provide a storage medium having stored therein an executable program that when executed by a processor, executes the method for resource determination performed by the network device.

DETAILED DESCRIPTION

Figure 1:
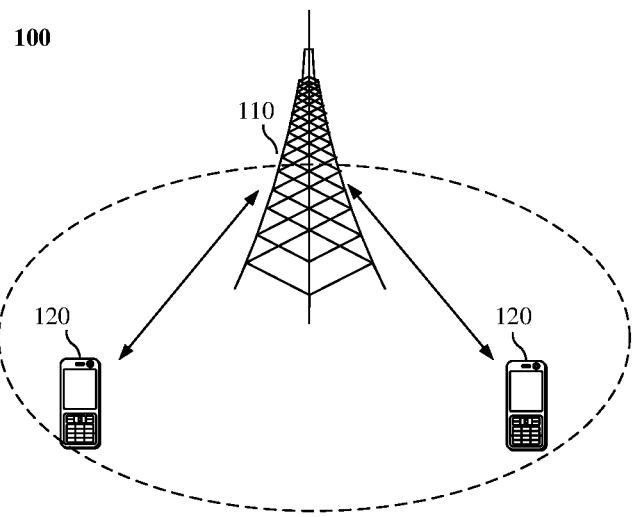
FIG. 1 is a schematic structural composition diagram of a communication system according to an embodiment of the disclosure.

In order to make the features and technical solutions of the embodiments of the present disclosure more fully understood, implementation of embodiments of the disclosure will be described in detail with reference to the accompanying drawings. The accompanying drawings are for purposes of illustration only and are not intended to limit the embodiments of the disclosure.

Before describing the method for resource determination provided in the embodiments of the disclosure in detail, a hybrid automatic repeat request acknowledgment (HARQ-ACK) in the related art is briefly described.

An unlicensed spectrum is a spectrum that is divided by countries and regions and may be used for radio device communication. An unlicensed spectrum is generally considered as a shared spectrum, namely, as long as communication devices in different communication systems meet requirements of a rule on the spectrum set by a country or region, the communication devices may use the spectrum without applying a dedicated spectrum authorization from a government. In order to allow various communication systems that use the unlicensed spectrum for wirelessly communicating on the spectrum without collision, some countries or regions introduce a rule that needed to be met for use the unlicensed spectrum. For example, in some regions, the communication device follows a "listen before talk" scheme. The scheme means that the communication device needs to listen to a channel of an unlicensed spectrum before transmitting a signal on the channel, and the communication device may transmit the signal only when the listening result of the channel is idle. If the listening result of the channel of the unlicensed spectrum is busy, the communication device may not transmit the signal. For the sake of fairness, a time length for transmitting a signal by the communication device using the channel of the unlicensed spectrum shall not exceed a maximum channel occupancy time (MCOT) in one transmission. With the development of wireless communication technology, the LTE system and the NR system may both consider to deploy a network on the unlicensed spectrum to utilize the unlicensed spectrum for transmission of data traffic.

In NR Rel-15, a dynamic determination of an HARQ feedback timing (HARQ-timing) is supported. The terminal device determines a preconfigured HARQ timing set K{k1, k2, . . . , kn}. Then the network device indicates one value of the preconfigured HARQ timing set as ki through a PDSCH-to-HARQ_feedback timing indicator information field in the downlink control information (DCI). The PDSCH scheduled by the DCI is transmitted in slot n, and the corresponding ACK/NACK information is transmitted in slot (n+ki). The preconfigured HARQ timing set includes at most 8 timing values, for a DCI format 1_0, the set is determined by a protocol, and for a DCI format 1_1, the set is configured by the network device.

For an NR-based access to unlicensed spectrum (NR-U) of Rel-16, supporting an introduction of a special value of the HARQ timing into the downlink control signaling is considered. The special value indicates that a transmission time and a resource of the ACK/NACK feedback information corresponding to the PDSCH scheduled by the DCI cannot be determined at present. Subsequently, the network device transmits triggering signaling, and the terminal device determines to transmit the ACK/NACK corresponding to the previous PDSCH based on the triggering signaling. For example, transmission of the feedback information corresponding to the previous PDSCH by the terminal device is triggered through: dedicated downlink control signaling, downlink control signaling for scheduling a transmission of the PDSCH, or downlink control signaling for scheduling a transmission of a PUSCH. In addition, in order to support the trigger-based ACK/NACK feedback, a PDSCH group may be considered to be introduced. When the network device explicitly indicates information of the PDSCH group through the DCI, to trigger the feedback of the ACK/NACK of the group, ACK/NACK information of all of the PDSCHs in the PDSCH group will be transmitted.

In the related art, when the terminal device receives DCI for scheduling a transmission of the PDSCH, the terminal device determines a transmission resource for transmitting the ACK/NACK information corresponding to the PDSCH according to a transmission resource of the PDSCH and a transmission parameter of the ACK/NACK information in the DCI. Since the transmission resource for transmitting the ACK/NACK information corresponding to the PDSCH is determined according to the DCI for scheduling the transmission of the PDSCH, the ACK/NACK feedback may have a binding relationship with at least one PDSCH transmission. In this way, the flexibility of triggering for the feedback may be severely limited, and system efficiency may be reduced.

In consideration of the above problem, the disclosure provides a method for resource determination. The method of resource determination in embodiments of the disclosure may be applied to various communication systems, such as a long term evolution (LTE) system, a frequency division duplex (FDD) system of LTE, a time division duplex (TDD) system of LTE, an NR system, or a 5G system.

As an example, a communication system 100 applied in an embodiment of the disclosure is illustrated in FIG. 1. The communication system 100 may include a network device 110. The network device 110 may be a device communicating with a terminal device 120 (also called as a communication terminal or a terminal). The network device 110 may provide communication coverage to a particular geographic area, and may communicate with a terminal device located within the coverage area. Optionally, the network device 110 may be an evolutional node B (eNB or eNodeB) in an LTE system, or a wireless controller in a cloud radio access network (CRAN), or the network device may be a mobile switching center, a relay station, an access point, an in-vehicle device, a wearable device, a hub, a switch, a bridge, a router, a network side device in a 5G network, a network device in a future evolved public land mobile network (PLMN), or the like.

The communication system 100 further includes at least one terminal device 120 located within the coverage of the network device 110. The terminal device 120 is connected to the network device 110 via a wired or wireless connection. The terminal device wirelessly connected to the network device 110 may be called as a "wireless communication terminal", a "wireless terminal" or a "mobile terminal". Examples of a mobile terminal include but are not limited to: a satellite telephone or a cellular telephone; a personal communications system (PCS) terminal that is capable of combining capabilities of cellular radio telephones, data processing, faxes, and data communication; a PDA that may include a radio telephone, a pager, an Internet/Intranet access, a Web browser, an organizer, a calendar and/or a global positioning system (GPS) receiver; and a conventional laptop and/or palmtop receivers or other electronic devices including a radio telephone transceiver. The terminal device may be an access terminal, user equipment (UE), a subscriber unit, a subscriber station, a mobile station, a remote console, a remote terminal, a mobile device, a user terminal, a terminal, a wireless communication device, a user agent, or a user apparatus. The access terminal may be a cellular telephone, a cordless telephone, a session initiation protocol (SIP) telephone, a wireless local loop (WLL) station, a personal digital assistant (PDA), a handheld device having a wireless communication function, a computing device, another processing device connected to a wireless modem, an in-vehicle device, a wearable device, a terminal device in a 5G network, a terminal device in a future evolved PLMN or the like.

Optionally, the terminal devices 120 may perform a device to device (D2D) communication with each other.

Optionally, the 5G system or the 5G network may be further referred to as a new radio (NR) system or an NR network.

FIG. 1 illustrates one network device and two terminal devices as an example. Optionally, the communication system 100 may include a plurality of network devices and coverage of each network device may include another number of terminal devices, which is not limited in the embodiment of the disclosure.

Optionally, the communication system 100 may further include other network entities such as a network controller and a mobility management entity, which is not limited in the embodiment of the disclosure.

It should be understood that, a device having a communication function in the network/system of embodiments of the disclosure may be referred to as a communication device. Taking the communication system 100 shown in FIG. 1 as an example, the communication device may include a network device 110 having a communication function and a terminal device 120 having a communication function. The network device 110 and the terminal device 120 may be specific devices described above, and details are not described herein again. The communication device may further include other devices in the communication system 100, such as network controllers, mobility management entities and the like, which is not limited in the embodiment of the disclosure.

Figure 2:
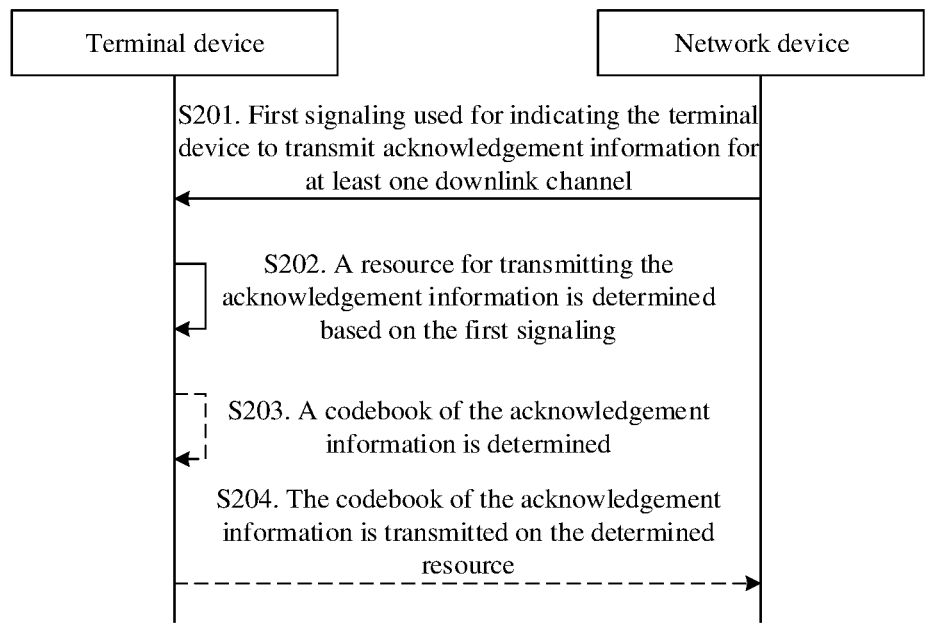
FIG. 2 is a schematic diagram of an optional processing flow of a method for resource determination according to an embodiment of the disclosure.

As illustrated in FIG. 2, an optional processing flow of a method for resource determination provided in an embodiment of the disclosure includes the following operations.

At operation S201, a terminal device receives first signaling used for indicating the terminal device to transmit acknowledgement information for at least one downlink channel.

In an embodiment of the disclosure, the first signaling is transmitted from a network device to the terminal device. The at least one downlink channel includes at least one of the following downlink channels.

A downlink channel transmitted before the first signaling, a first downlink channel scheduled by the first signaling, or a downlink channel before the first downlink channel scheduled by the first signaling.

The acknowledgement information for the at least one downlink channel transmitted by the terminal device according to the first signaling will be described below.

In practice, first indication information in the first signaling is used for indicating that whether the terminal device transmits acknowledgement information corresponding to a downlink channel group. The downlink channel group is determined according to a configuration parameter transmitted by the network device. Optionally, the downlink channel group is determined by the terminal device according to high-layer signaling. For example, the high-layer signaling indicates a group strategy for the downlink channel group, and the terminal device determines the downlink channel group according to the group strategy; or the terminal device determines a group of potential transmission opportunities of downlink channels according to the high-layer signaling, and the downlink channels received on the group of potential transmission opportunities of the downlink channels are the downlink channel group.

In some embodiments, when the first signaling being used for scheduling the first downlink channel (e.g., PDSCH) and the first indication information in the first signaling being a first value, the first indication information indicates the terminal device to transmit acknowledgement information for all HARQ processes. Optionally, when the first indication information is 1 bit and the bit value of the first indication information is "1", the first indication information indicates the terminal device to transmit the acknowledgement information for all HARQ processes, specifically, one HARQ process is transmitted through one PDSCH. If the terminal device does not receive one or more HARQ processes, the bit value corresponding to the not-received-HARQ process is NACK when the terminal device transmits acknowledgement information to the network device. For example, the network device transmits four HARQ processes and the terminal device detects the first, second, and fourth HARQ processes, then the third bit is NACK when the terminal device transmits the acknowledgement information to the network device.

In other embodiments, when the first signaling being used for scheduling the first downlink channel (e.g., PDSCH) and the first indication information in the first signaling being a second value, the first indication information indicates the terminal device to transmit acknowledgement information for the first downlink channel scheduled by the first signaling; or the first indication information indicates the terminal device to transmit acknowledgement information for a first downlink channel group to which the first downlink channel scheduled by the first signaling belongs. Optionally, the first indication information is 1 bit and the bit value of the first indication information is "0", the first indication information indicates the terminal device to transmit the acknowledgement information for the first downlink channel or the acknowledgement information for the first downlink channel group to which the first downlink channel belongs.

In still other embodiments, when the first signaling being used for scheduling an uplink channel (e.g., PUSCH), the first indication information in the first signaling being used for indicating the terminal device to transmit the acknowledgement information for the at least one downlink channel, and the first indication information being a second value, the first indication information indicates the terminal device not to transmit acknowledgement information. When the first indication information being the first value, the first indication information indicates the terminal device to transmit the acknowledgement information for all HARQ processes. Optionally, when the first indication information is 1 bit and the bit value of the first indication information is "1", the first indication information indicates the terminal device to transmit the acknowledgement information for all HARQ processes, specifically, one HARQ process is transmitted through one PDSCH. If the terminal device does not receive one or more HARQ processes, the bit value corresponding to the not-received-HARQ process is NACK when the terminal device transmits acknowledgement information to the network device. For example, the network device transmits four HARQ processes and the terminal device detects the first, second, and fourth HARQ processes, then the third bit is NACK when the terminal device transmits the acknowledgement information to the network device. If the bit value of the first indication information is "0", the first indication information indicates the terminal device not to transmit acknowledgement information.

In still other embodiments, the first indication information is used for indicating information of the downlink channel (e.g., PDSCH) group. For example, if a system supports a maximum of four PDSCH groups, the first indication information is four bits, and the four bits correspond to four PDSCH groups respectively, the following operations may be applied. When a first bit of the first indication information is a first value, the first indication information indicates the terminal device to transmit acknowledgement information for a downlink channel in the downlink channel group corresponding to the first bit. When the first bit of the first indication information is a second value, the first indication information indicates the terminal device not to transmit the acknowledgement information for the downlink channel in the downlink channel group corresponding to the first bit. Optionally, the first value is "1", and the second value is "0". In this case, the first indication information may be dedicated trigger signaling which is dedicated to trigger the feedback information. When the first indication information is dedicated trigger signaling, a network overhead may be small, and the first indication information may accurately indicate that whether the terminal device transmits the acknowledgement information for different downlink channel groups.

At operation S202, the terminal device determines, based on the first signaling, a resource for transmitting the acknowledgement information.

In some embodiments, the terminal device determines a time domain resource for transmitting the acknowledgement information, according a transmission location of a downlink channel, with a latter transmission time, of the following two downlink channels: a last downlink channel in the at least one downlink channel, and a downlink channel carrying the first scheduling signaling. Optionally, the latter transmission time means that an end time is the latter one between transmissions or a start time is the latter one between transmissions. For example, there are two channels: a downlink channel 1 and a downlink channel 2, and the transmission location of the downlink channel 2 is after the transmission location of the downlink channel 1, then the downlink channel 2 is considered to be the latter downlink channel between the downlink channel 1 and the downlink channel 2. In addition, if a downlink channel carrying the first scheduling signaling is a downlink channel 3, and a transmission location of the downlink channel 3 is before the downlink channel 2, then the terminal device determines a time domain resource for transmitting the acknowledgement information based on the transmission location of the downlink channel 2.

In other embodiments, when the at least one downlink channel includes the first downlink channel scheduled by the first signaling, the terminal device determines the time domain resource for transmitting the acknowledgement information according to a transmission location of the first downlink channel. It would be understood that when the first signaling indicates the terminal device to transmit the acknowledgement information for the first downlink channel scheduled by the first signaling, the terminal device determines the time domain resource for transmitting the acknowledgement information according to the transmission location of the first downlink channel Taking the first signaling being DCI as an example, a PDSCH that triggers the feedback includes the PDSCH scheduled by the DCI, and without a doubt, the PDSCH is transmitted after the DCI, therefore, the time domain resource of the acknowledgement information is determined based on the PDSCH. Under the condition that an indication range of the feedback timing is unchanged, the transmission resource of the feedback information may be configured in a larger effective time domain resource, thereby improving the flexibility of a PUCCH allocation.

In still other embodiments, when the at least one downlink channel does not include the first downlink channel scheduled by the first signaling, or the first signaling is not used for scheduling a downlink channel, the terminal device determines a time domain resource for transmitting the acknowledgement information according to a transmission location of the downlink channel carrying the first signaling. Herein, when the at least one downlink channel does not include the first downlink channel scheduled by the first signaling, without a doubt, the transmission location of the last downlink channel of the at least one downlink channel is before the PDCCH carrying the first signaling. For example, the first signaling schedules a downlink channel 1 or the first signaling does not schedule a downlink channel, and the first signaling is carried in a downlink channel 2, then the terminal device determines the time domain resource for transmitting the acknowledgement information according to the transmission location of the downlink channel 2. It would be understood that when there is no valid downlink channel (PDSCH), the transmission resource of the acknowledgement information is determined based on the first signaling, then an understanding ambiguity caused when the terminal device and the network device transmitting data with each other may be avoided. For example, if DCI A is used for triggering the transmission of the acknowledgement information, and the acknowledgement information is determined based on a transmission location of a PDSCH A, and the PDSCH A is scheduled by DCI B, the terminal device may correctly transmit the feedback information on the premise that the DCI A and the DCI B are correctly received. Otherwise, there may be an understanding ambiguity between the base station and the terminal, and the feedback information may not be transmitted correctly.

In practice, the time domain resource for transmitting the acknowledgement information is not only related to the transmission location of the channels but also related to a feedback timing. In other words, the time domain resource for transmitting the acknowledgement information is further determined according to the feedback timing. Optionally, the feedback timing is indicated by the first signaling; or, the feedback timing is configured by the network device; or, the feedback timing is determined by a protocol.

In an embodiment of the disclosure, the time domain resource for transmitting the acknowledgement information is a slot for transmitting the acknowledgement information. A serial number of the slot for transmitting the acknowledgement information is a sum of a serial number of a slot for transmitting the first downlink channel and the feedback timing; or, the serial number of the slot for transmitting the acknowledgement information is a sum of a serial number of a slot for transmitting the downlink channel carrying the first signaling and the feedback timing.

On a basis of the above description of the time domain resource for transmitting the acknowledgement information, the following embodiments may be understood.

In some embodiments, an interval between the downlink channel carrying the first signaling and an uplink channel carrying the acknowledgement information is not less than a first threshold. The first threshold is not less than a preparation delay of the acknowledgement information or a preparation delay of the uplink channel carrying the acknowledgement information.

In other embodiments, an interval between the last downlink channel in the at least one downlink channel and the uplink channel carrying the acknowledgement information is not less than a second threshold. The second threshold is not less than a sum of a processing delay of the downlink channel and a preparation delay of the acknowledgement information; or, the second threshold is not less than a sum of the processing delay of the downlink channel and a preparation delay of the uplink channel carrying the acknowledgement information.

After operation S202 is performed, the method may further include the following operations.

At operation S203, the terminal device determines a codebook of the acknowledgement information.

In some embodiments, the codebook of acknowledgement information includes acknowledgement information corresponding to all of the at least one downlink channel.

In other embodiments, the codebook of acknowledgement information includes acknowledgement information corresponding to all of the at least one downlink channel. However, a bit position of the acknowledgement information corresponding to the second downlink channel of the at least one downlink channel is set to a preset value (optionally, the preset value is NACK). In this way, the size of the codebook is constant, an understanding ambiguity caused when the network device interacting with the terminal device may be avoided.

In still other embodiments, the codebook of the acknowledgement information includes acknowledgement information corresponding to a downlink channel except the second downlink channel in the at least one downlink channel. In this way, the size of the codebook may be dynamically adjusted according to an actual scheduling, thereby reducing a signaling overhead of the acknowledgement information.

In the abovementioned embodiment, an interval between the second downlink channel and the uplink channel carrying the acknowledgement information is less than the second threshold. The second downlink channel is M downlink channels in the at least one downlink channel, and M is a positive integer greater than zero.

At operation S204, the terminal device transmits the codebook of the acknowledgement information on the determined resource.

In various embodiments of the disclosure, the first signaling is one of: downlink control signaling (DCI) for scheduling a transmission of a PDSCH; or DCI for scheduling a transmission of a PUSCH; or DCI dedicated to trigger a transmission of acknowledgement information. In the embodiments of the disclosure, the first signaling for determining the transmission of the feedback acknowledgement resource may be the DCI for scheduling the transmission of the PUSCH or the DCI dedicated to trigger a transmission of the acknowledgement information. Therefore, the terminal device may determine the resource for transmitting the feedback acknowledgement without relying on the PDSCH, and then the flexibility of triggering the feedback acknowledgement and the system efficiency may be improved.

Next, the method for resource determination provided in the embodiments of the disclosure is described below with respect to some embodiments corresponding to different scenarios.

Embodiment 1

Figure 3:
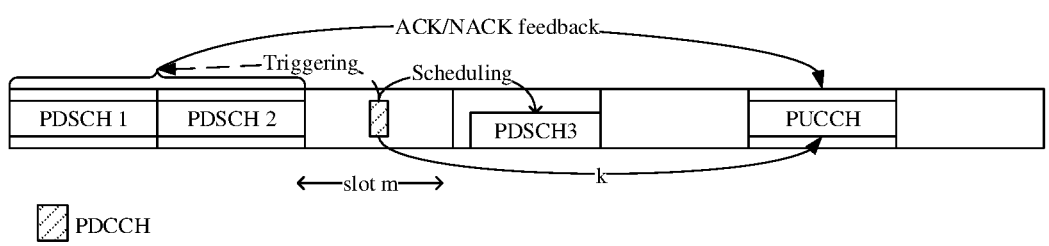
FIG. 3 is a schematic diagram of a transmission of acknowledgement information according to an embodiment of the disclosure.

FIG. 3 illustrates a schematic diagram of another transmission of the acknowledgement information provided in an embodiment of the disclosure. The terminal device receives a PDCCH in slot m, and DCI in the PDCCH is used for scheduling a transmission of a PDSCH 3 in slot (m+1). The first indication information in the DCI indicates the terminal to transmit acknowledgement information for a PDSCH 1 and a PDSCH 2. The PDSCH 1 and PDSCH 2 may belong to the same PDSCH group or different PDSCH groups, the PDSCH 1 is transmitted in slot (m−2) and the PDSCH 2 is transmitted in slot (m−1). The terminal device determines that the value of the feedback timing is k, and the value of the feedback timing: is indicated by a PDSCH-to-HARQ_feedback timing indicator in the DCI; or is configured by other information transmitted by the network device; or is determined by a protocol. The terminal device determines that the acknowledgement information is transmitted in slot (m+k). Further, the following conditions may be required to be met.

A time interval between a PDCCH and a PUCCH is not less than a first predetermined value, and the first predetermined value is not less than a preparation delay of the PUCCH; and/or a time interval between the PDSCH 2 and the PUCCH is not less than a second predetermined value and the second predetermined value is not less than a sum of a processing delay of the PDSCH and the preparation delay of the PUCCH.

Here, the PUCCH is used for carrying the acknowledgement information. The codebook of the acknowledgement information includes {b1, b2}.

Embodiment 2

Figure 4:
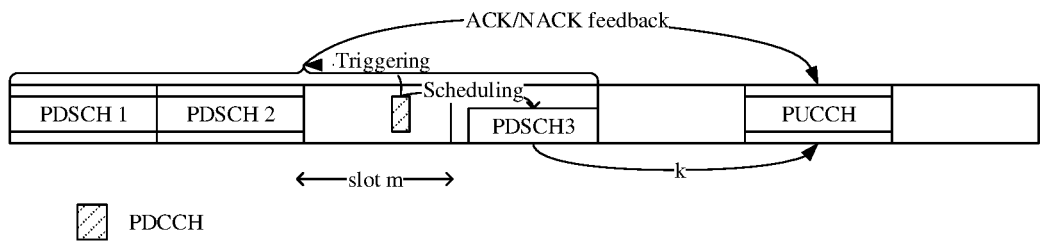
FIG. 4 is a schematic diagram of another transmission of the acknowledgement information according to embodiment of the disclosure.

FIG. 4 illustrates a schematic diagram of another transmission of the acknowledgement information provided in an embodiment of the disclosure. The terminal device receives a PDCCH in slot m, and DCI in the PDCCH is used for scheduling a transmission of a PDSCH 3 in slot (m+1). The first indication information in the DCI indicates the terminal to transmit feedback information for PDSCH 1 to PDSCH 3. The PDSCH 1 is transmitted in slot (m−2) and the PDSCH 2 is transmitted in slot (m−1). The terminal device determines that the value of the feedback timing is k; and the value of the feedback timing: is indicated by the PDSCH-to-HARQ_feedback timing indicator in the DCI; or is configured by other information transmitted by the network device; or is determined by a protocol. The terminal device determines that the acknowledgement information is transmitted in slot (m+1+k). Optionally, a time interval between PDSCH 3 and PUCCH is not less than a second predetermined value, and the second predetermined value is less than the sum of the processing delay the PDSCH and the preparation delay of the PUCCH.

Here, the PUCCH is used for carrying the acknowledgement information. The codebook of the acknowledgement information includes {b1, b2, b3}.

Embodiment 3

Figure 5:
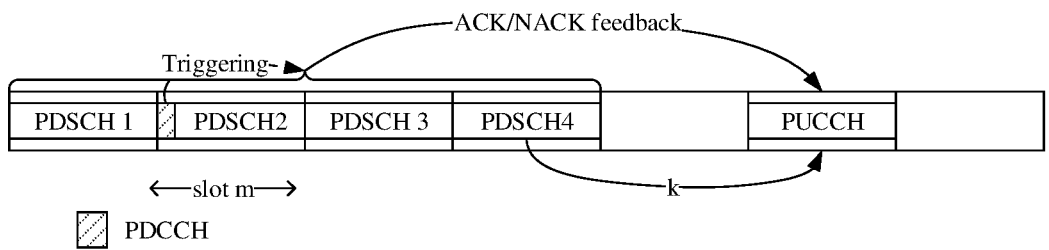
FIG. 5 is a schematic diagram of yet another transmission of the acknowledgement information according to an embodiment of the disclosure.

FIG. 5 illustrates a schematic diagram of yet another transmission of the acknowledgement information provided in an embodiment of the disclosure. The terminal device receives a PDCCH in slot m, and DCI in the PDCCH may be used for scheduling a PDSCH 2 or a PUSCH or may be dedicated to trigger acknowledgement information. The first indication information in the DCI indicates the terminal to transmit acknowledgement information for PDSCH 1 to PDSCH 4. The PDSCH 1 is transmitted in slot (m−1), and the PDSCH 3 and the PDSCH 4 are transmitted in slot (m+1) and slot (m+2), respectively. The terminal device determines that the value of the feedback timing is k; and the value of the feedback timing: is indicated by the PDSCH-to-HARQ_feedback timing indicator in the DCI; or is configured by other information transmitted by the network device; or is determined by a protocol. The terminal device determines that the acknowledgement information is transmitted in slot (m+2+k). Further, the following conditions may be required to be met: a time interval between the PDSCH 4 and the PUCCH is less than a second threshold, a time interval between the PDSCH 3 and the PUCCH is not less than the second threshold; and the second threshold is not less than the sum of processing delay of the PDSCH and the preparation delay of the PUCCH. Here, the codebook of the acknowledgement information includes {b1, b2, b3} or {b1, b2, b3, NACK}.

Figure 6:
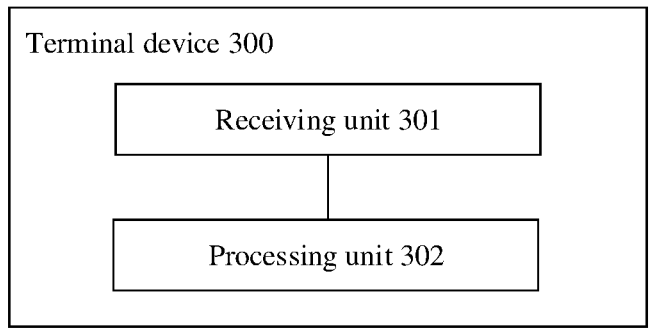
FIG. 6 is a schematic structural composition diagram of a terminal device according to an embodiment of the disclosure.

In order to implement the method for resource determination described in the embodiments of the disclosure, an embodiment of the disclosure further provides a terminal device. FIG. 6 illustrates a schematic structural composition diagram of the terminal device 300 including a receiving unit 301 and a processing unit 302.

The receiving unit 301 is configured to receive first signaling used for indicating the terminal device to transmit acknowledgement information for at least one downlink channel.

The processing unit 302 is configured to determine, based on the first signaling, a resource for transmitting the acknowledgement information.

In an embodiment of the disclosure, the at least one downlink channel includes at least one of:
a downlink channel transmitted before the first signaling, a first downlink channel scheduled by the first signaling, or a downlink channel before the first downlink channel scheduled by the first signaling.

In an embodiment of the disclosure, the processing unit 302 is configured to determine a time domain resource for transmitting the acknowledgement information, according to a transmission location of a downlink channel, with a latter transmission time, of the following two downlink channels: a last downlink channel in the at least one downlink channel, and a downlink channel carrying the first scheduling signaling.

In an embodiment of the disclosure, the processing unit 302 is configured to determine a time domain resource for transmitting the acknowledgement information according to a transmission location of the first downlink channel.

In an embodiment of the disclosure, the processing unit 302 is configured to: responsive to the at least one downlink channel not including the first downlink channel scheduled by the first signaling, or the first signaling being not used for scheduling a downlink channel:
determine a time domain resource for transmitting the acknowledgement information according to a transmission location of the downlink channel carrying the first signaling.

In an embodiment of the disclosure, the time domain resource for transmitting the acknowledgement information is further determined according to a feedback timing.

In an embodiment of the disclosure, the feedback timing is indicated by the first signaling; or the feedback timing is configured by a network device; or the feedback timing is determined by a protocol.

In an embodiment of the disclosure, an interval between the downlink channel carrying the first signaling and an uplink channel carrying the acknowledgement information is not less than a first threshold. The first threshold is not less than a preparation delay of the acknowledgement information or a preparation delay of the uplink channel carrying the acknowledgement information.

In an embodiment of the disclosure, an interval between the last downlink channel in the at least one downlink channel and the uplink channel carrying the acknowledgement information is not less than a second threshold. The second threshold is not less than a sum of a processing delay of a downlink channel and a preparation delay of the acknowledgement information; or the second threshold is not less than a sum of the processing delay of a downlink channel and a preparation delay of the uplink channel carrying the acknowledgement information.

In an embodiment of the disclosure, the processing unit 302 is further configured to determine a codebook of the acknowledgement information.

The codebook of the acknowledgement information includes one of: acknowledgement information corresponding to all of the at least one downlink channel; or acknowledgement information corresponding to the downlink channel(s) except a second downlink channel in the at least one downlink channel.

An interval between the second downlink channel and the uplink channel carrying the acknowledgement information is less than the second threshold.

In an embodiment of the disclosure, in a case of the codebook of the acknowledgement information including the acknowledgement information corresponding to all of the at least one downlink channel, acknowledgement information corresponding to the second downlink channel in the at least one downlink channel is a preset value.

An interval between the second downlink channel and the uplink channel carrying the acknowledgement information is less than the second threshold.

In an embodiment of the disclosure, first indication information in the first signaling is used for indicating that whether the terminal device transmits feedback acknowledgement corresponding to a downlink channel group.

In an embodiment of the disclosure, when the first indication information in the first signaling being a first value, the first indication information indicates the terminal device to transmit acknowledgement information for all HARQ processes.

In an embodiment of the disclosure, when the first signaling being used for scheduling a first downlink channel, the first indication information in the first signaling being used for indicating the terminal device to transmit the acknowledgement information for the at least one downlink channel, and the first indication information being a second value, the first indication information indicates the terminal device to perform one of:
a transmission of acknowledgement information for the first downlink channel scheduled by the first signaling; or, a transmission of acknowledgement information for a first downlink channel group to which the first downlink channel scheduled by the first signaling belongs.

In an embodiment of the disclosure, in a case of the first signaling being used for scheduling an uplink channel, the first indication information in the first signaling being used for indicating the terminal device to transmit the acknowledgement information for the at least one downlink channel, and the first indication information being a second value, the first indication information indicates the terminal device not to transmit acknowledgement information. Correspondingly, the processing unit 302 is further configured to determine the codebook of the acknowledgement information.

In an embodiment of the disclosure, the downlink channel group is configured by the network device; or the downlink channel group is determined by the terminal device according to a predetermined rule.

In an embodiment of the disclosure, the first signaling is one of: DCI for scheduling a transmission of a PDSCH; DCI for scheduling a transmission of a PUSCH; or DCI dedicated to trigger a transmission of acknowledgement information.

Figure 7:
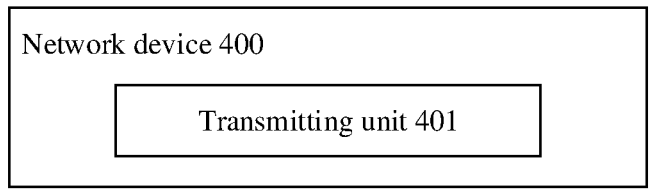
FIG. 7 is a schematic structural composition diagram of a network device according to an embodiment of the disclosure.

In order to implement the method for resource determination described in the embodiments of the disclosure, an embodiment of the disclosure further provides a network device. FIG. 7 illustrates a structural composition diagram of the network device 400 including a transmitting unit 401.

The transmitting unit 401 is configured to transmit first signaling used for indicating a terminal device to transmit acknowledgement information for at least one downlink channel. The first signaling is used for the terminal device to determine a resource for transmitting the acknowledgement information. The at least one downlink channel comprises at least one of: a downlink channel transmitted before the first signaling, a first downlink channel scheduled by the first signaling, or a downlink channel before the first downlink channel scheduled by the first signaling.

In an embodiment of the disclosure, a time domain resource for transmitting the acknowledgement information is further determined according to a feedback timing. The feedback timing is indicated by the first signaling; or the feedback timing is configured by the network device; or the feedback timing is determined by a protocol.

In an embodiment of the disclosure, an interval between a downlink channel carrying the first signaling and an uplink channel carrying the acknowledgement information is not less than a first threshold. The first threshold is not less than a preparation delay of the acknowledgement information or a preparation delay of the uplink channel carrying the acknowledgement information.

In an embodiment of the disclosure, an interval between the last downlink channel in the at least one downlink channel and the uplink channel carrying the acknowledgement information is not less than a second threshold. The second threshold is not less than a sum of a processing delay of a downlink channel and a preparation delay of the acknowledgement information; or the second threshold is not less than a sum of the processing delay of the downlink channel and a preparation delay of the uplink channel carrying the acknowledgement information.

In an embodiment of the disclosure, first indication information in the first signaling is used for indicating that whether the terminal device transmits acknowledgement information corresponding to a downlink channel group.

In an embodiment of the disclosure, in a case of the first indication information in the first signaling being a first value, the first indication information indicates the terminal device to transmit acknowledgement information for all HARQ processes.

In an embodiment of the disclosure, in a case of the first signaling being used for scheduling the first downlink channel, the first indication information in the first signaling being used for indicating the terminal device to transmit the acknowledgement information for the at least one downlink channel, and the first indication information being a second value, the first indication information indicates the terminal device to perform one of:

a transmission of acknowledgement information for the first downlink channel scheduled by the first signaling;

or a transmission of acknowledgement information for a first downlink channel group to which the first downlink channel scheduled by the first signaling belongs.

In an embodiment of the disclosure, in a case of the first signaling being used for scheduling an uplink channel, the first indication information in the first signaling being used for indicating the terminal device to transmit the acknowledgement information for the at least one downlink channel, and the first indication information being a second value, the first indication information indicates:

the terminal device not to transmit acknowledgement information.

In an embodiment of the disclosure, the transmitting unit 401 is configured to transmit high-layer signaling used for the terminal device to determine a downlink channel group.

In an embodiment of the disclosure, the first signaling is one of: DCI for scheduling a transmission of a PDSCH; DCI for scheduling a transmission of a PUSCH; or DCI dedicated to trigger a transmission of acknowledgement information.

An embodiment of the disclosure further provides a terminal device including a processor and a memory for storing a computer program capable of running on the processor. The processor is configured to run the computer program to execute operations of the method for resource determination.

An embodiment of the disclosure further provides a network device including a processor and a memory for storing a computer program capable of running on the processor. The processor is configured to configured run the computer program to execute operations of the method for resource determination.

Figure 8:
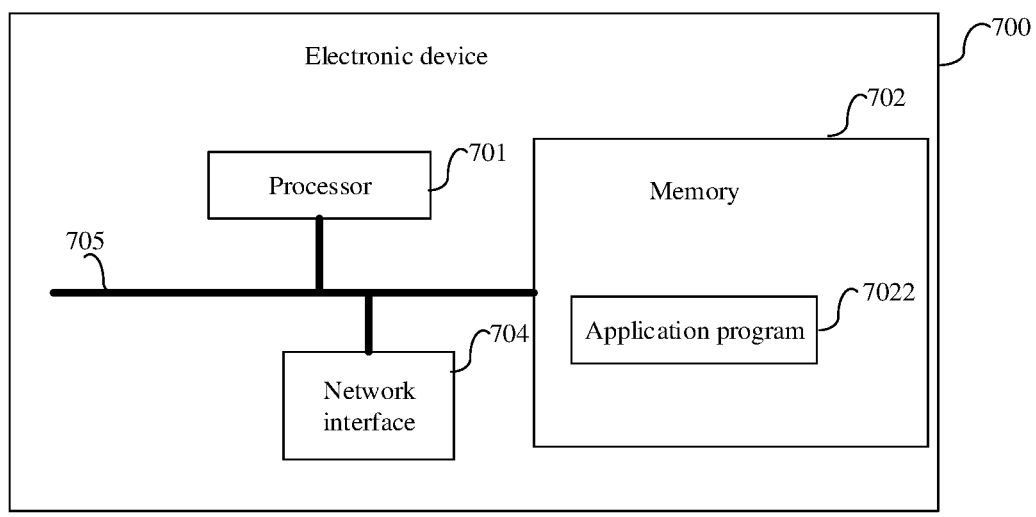
FIG. 8 is a schematic hardware structural composition diagram of an electronic device according to an embodiment of the disclosure.

FIG. 8 is a schematic hardware structural composition diagram of an electronic device (terminal device and network device) according to an embodiment of the disclosure. The electronic device 700 includes at least one processor 701, a memory 702, and at least one network interface 704. Components of the electronic device 700 are coupled together through a bus system 705. It should be understood that the bus system 705 is used for implementing a connection communication between these components. The bus system 705 not only includes a data bus, but also includes a power bus, a control bus, and a state signal bus. For clear illustration, each bus is marked as the bus system 705 in FIG. 8.

It can be understood that memory 702 may be volatile memory or non-volatile memory, and may include both a volatile memory and a non-volatile memory. The non-volatile memory may be a read-only memory (ROM), a programmable read-only memory (PROM), an erasable programmable read-only memory (EPROM), an electrically erasable programmable read-only memory (EEPROM), a ferromagnetic random access memory (FRAM), a flash memory, a magnetic surface memory, an optical disk, or a compact disc read-only memory (CD-ROM). The magnetic surface memory may be a disk memory or a tape memory. The volatile memory may be a random access memory (RAM), and is used as an external cache. Through exemplary but not limitative description, many forms of RAMs may be used, such as a static random access memory (SRAM), a synchronous static random access memory (SSRAM), a dynamic random access memory (DRAM), a synchronous dynamic random access memory (SDRAM), a double data rate synchronous dynamic random access memory (DDRSDRAM), an enhanced synchronous dynamic random access memory (ESDRAM), a syncLink dynamic random access memory (SLDRAM), a direct rambus random access memory (DRRAM). The memory 702 described in embodiments of the disclosure is intended to include but not limited to these memories and any other suitable types of memories.

The memory 702 in embodiments of the disclosure may be used for storing various types of data to support the operations of the electronic device 700. Examples of such data include any computer program running on the electronic device 700, such as an application program 7022. A program used for implementing the method of the embodiments of the disclosure may be included in the application program 7022.

The method disclosed in the abovementioned embodiments of the disclosure may be applied to or implemented by the processor 701. The processor 701 may be an integrated circuit chip, and has a signal processing capability. During implementation, the steps of the above method may be implemented by using a hardware integrated logic circuits in the processor 701 or implemented by using an instruction in a software form. The processor 701 may be a general purpose processor, a digital signal processor (DSP), or another programmable logic device, discrete gate or transistor logic device, discrete hardware component, or the like. The processor 701 may implement or perform the methods, steps, and logical block diagrams disclosed in the embodiments of the disclosure. The general purpose processor may be a microprocessor or any conventional processor and the like. Steps of the methods disclosed with reference to the embodiments of the disclosure may be directly executed and completed by means of a hardware decoding processor, or may be executed and completed by a combination of hardware and software modules in the decoding processor. The software module may be located in a storage medium in the memory 702, and the processor 701 reads information in the memory 702 and completes the steps in the foregoing methods in conjunction with hardware of the processor.

In an exemplary embodiment, the electronic device 700 may be implemented by one or more of: an application specific integrated circuits (ASIC), a DSP, a programmable logic device (PLD), a complex programmable logic device (CPLD), a FPGA, a general purpose processor, a controller, an MCU, an MPUs, or other electronic components for implementing the foregoing methods.

An embodiment of the disclosure further provides a storage medium having stored therein a computer program.

Optionally, the storage medium may be applied to the terminal device in the embodiments of the disclosure, and the computer program causes the computer to execute a corresponding flow in the method in the embodiments of the disclosure. Details will not be elaborated herein again for brief description.

Optionally, the storage medium may be applied to the network device in the embodiments of the disclosure, and the computer program causes the computer to execute a corresponding flow in the method in the embodiments of the disclosure. Details will not be elaborated herein again for brief description.

The disclosure is described with reference to flowcharts and/or block diagrams of a method, device (system), and computer program product according to the embodiments of the disclosure. It should be understood that each flow and/or block in the flowcharts and/or the block diagrams and combinations of flows and/or blocks in the flowcharts and/or block diagrams may be implemented by computer program instructions. These computer program instructions may be provided for a universal computer, a dedicate computer, an embedded processor, or a processor of other programmable data processing devices to generate a machine, such that a device for realizing a function specified in one or more flows in the flowcharts and/or one or more blocks in the block diagrams is generated by the instructions executed by the computer or the processor of the other programmable data processing devices.

These computer program instructions may also be stored in a computer-readable memory capable of guiding the computer or the other programmable data processing devices to operate in a specific manner, such that a product including an instruction device may be generated by the instructions stored in the computer-readable memory, the instruction device realizing the function specified in one or many flows in the flowcharts and/or one or many blocks in the block diagrams.

These computer program instructions may further be loaded onto the computer or the other programmable data processing devices, such that a series of operating steps are executed on the computer or the other programmable data processing devices, to generate processes implemented by the computer, such that steps for realizing the function specified in one or many flows in the flowcharts and/or one or many blocks in the block diagrams are provided by the instructions executed on the computer or the other programmable data processing devices.

The above are only the preferred embodiments of the disclosure and not intended to limit the scope of protection of the disclosure. Any modifications, equivalent replacements, improvements and the like made within the spirit and principle of the disclosure shall fall within the scope of protection of the disclosure.

What is claimed is:

1. A method for resource determination, comprising:
   receiving, by a terminal device, first signaling used for indicating the terminal device to transmit acknowledgement information for at least one downlink channel;
   if the first signaling is used for scheduling a first downlink channel, determining, by the terminal device, a time domain resource for transmitting the acknowledgement information according to a transmission location of the first downlink channel; and
   if the first signaling is not used for scheduling a downlink channel, determining, by the terminal device, a time domain resource for transmitting the acknowledgement information according to a transmission location of the downlink channel carrying the first signaling;
   wherein when first indication information of 1 bit in the first signaling is a first value of 1, the first indication information indicates the terminal device to transmit acknowledgement information for all hybrid automatic repeat request (HARQ) processes; and
   when the first signaling is used for scheduling the first downlink channel and the first indication information in the first signaling is a second value of 0, the first indication information indicates the terminal device to perform one of:
   a transmission of acknowledgement information for the first downlink channel scheduled by the first signaling; or
   a transmission of acknowledgement information for a first downlink channel group to which the first downlink channel scheduled by the first signaling belongs.

2. The method of claim 1, wherein the at least one downlink channel comprises at least one of:
   the first downlink channel scheduled by the first signaling, or a downlink channel before the first downlink channel scheduled by the first signaling.

3. The method of claim 1, wherein the time domain resource for transmitting the acknowledgement information is further determined according to a feedback timing.

4. The method of claim 3, wherein
   the feedback timing is indicated by the first signaling.

5. The method of claim 1, wherein an interval between the downlink channel carrying the first signaling and an uplink channel carrying the acknowledgement information is not less than a first threshold.

6. The method of claim 1, further comprising:
determining, by the terminal device, a codebook of the acknowledgement information;
wherein the codebook of the acknowledgement information comprises:
acknowledgement information corresponding to all of the at least one downlink channel.

7. The method of claim 1, wherein the first signaling is:
downlink control information (DCI) for scheduling a transmission of a physical downlink shared channel (PDSCH).

8. A terminal device comprising:
a network interface, configured to receive first signaling used for indicating the terminal device to transmit acknowledgement information for at least one downlink channel; and
a processor, configured to:
if the first signaling is used for scheduling a first downlink channel, determine a time domain resource for transmitting the acknowledgement information according to a transmission location of the first downlink channel; and
if the first signaling is not used for scheduling a downlink channel, determine a time domain resource for transmitting the acknowledgement information according to a transmission location of the downlink channel carrying the first signaling;
wherein when first indication information of 1 bit in the first signaling is a first value of 1, the first indication information indicates the terminal device to transmit acknowledgement information for all hybrid automatic repeat request (HARQ) processes; and
when the first signaling is used for scheduling the first downlink channel and the first indication information in the first signaling is a second value of 0, the first indication information indicates the terminal device to perform one of:
a transmission of acknowledgement information for the first downlink channel scheduled by the first signaling; or
a transmission of acknowledgement information for a first downlink channel group to which the first downlink channel scheduled by the first signaling belongs.

9. The terminal device of claim 8, wherein the at least one downlink channel comprises at least one of:
the first downlink channel scheduled by the first signaling, or a downlink channel before the first downlink channel scheduled by the first signaling.

10. The terminal device of claim 8, wherein the time domain resource for transmitting the acknowledgement information is further determined according to a feedback timing.

11. The terminal device of claim 10, wherein
the feedback timing is indicated by the first signaling.

12. The terminal device of claim 10, wherein an interval between the downlink channel carrying the first signaling and an uplink channel carrying the acknowledgement information is not less than a first threshold.

13. The terminal device of claim 8, wherein the processor is further configured to determine a codebook of the acknowledgement information;
wherein the codebook of the acknowledgement information comprises:
acknowledgement information corresponding to all of the at least one downlink channel.

14. The terminal device of claim 8, wherein the first signaling is:
downlink control information (DCI) for scheduling a transmission of a physical downlink shared channel (PDSCH).

15. A network device, comprising:
a network interface, configured to transmit first signaling used for indicating a terminal device to transmit acknowledgement information for at least one downlink channel;
wherein if the first signaling is used for scheduling a first downlink channel, the first signaling is used for the terminal device to determine a time domain resource for transmitting the acknowledgement information according to a transmission location of the first downlink channel;
if the first signaling is not used for scheduling a downlink channel, the first signaling is used for the terminal device to determine a time domain resource for transmitting the acknowledgement information according to a transmission location of the downlink channel carrying the first signaling;
wherein when first indication information of 1 bit in the first signaling is a first value of 1, the first indication information indicates the terminal device to transmit acknowledgement information for all hybrid automatic repeat request (HARQ) processes; and
when the first signaling is used for scheduling the first downlink channel and the first indication information in the first signaling is a second value of 0, the first indication information indicates the terminal device to perform one of:
a transmission of acknowledgement information for the first downlink channel scheduled by the first signaling; or
a transmission of acknowledgement information for a first downlink channel group to which the first downlink channel scheduled by the first signaling belongs.

16. The network device of claim 15, wherein the at least one downlink channel comprises at least one of:
the first downlink channel scheduled by the first signaling, or a downlink channel before the first downlink channel scheduled by the first signaling.

\* \* \* \* \*